United States Patent
Overholt (10) Patent No.: US 9,696,233 B2
(45) Date of Patent: Jul. 4, 2017

(54) METHOD FOR BALANCING A PROPSHAFT ASSEMBLY

(71) Applicant: American Axle & Manufacturing, Inc., Detroit, MI (US)

(72) Inventor: John D. Overholt, Windsor (CA)

(73) Assignee: American Axle & Manufacturing, Inc., Detroit, MI (US)

( * ) Notice: Subject to any disclaimer, the term of this patent is extended or adjusted under 35 U.S.C. 154(b) by 318 days.

(21) Appl. No.: 14/461,750

(22) Filed: Aug. 18, 2014

(65) Prior Publication Data

US 2016/0047705 A1 Feb. 18, 2016

(51) Int. Cl.
*G01M 1/32* (2006.01)
*G01M 1/34* (2006.01)

(52) U.S. Cl.
CPC ............. *G01M 1/32* (2013.01); *G01M 1/34* (2013.01)

(58) Field of Classification Search
CPC .................................. G01M 1/32; G01M 1/34
USPC ............................................ 73/468; 464/180
See application file for complete search history.

(56) References Cited

U.S. PATENT DOCUMENTS

| | | | | |
|---|---|---|---|---|
| 861,463 | A * | 7/1907 | Hyde | F16F 15/32 295/6 |
| 4,887,989 | A * | 12/1989 | Kerecman | F16C 3/02 464/180 |
| 5,422,776 | A * | 6/1995 | Thorson | F16F 15/32 360/98.07 |
| 5,767,403 | A | 6/1998 | Kopp et al. | |
| 6,840,105 | B2 | 1/2005 | Calkins et al. | |
| 6,923,058 | B2 | 8/2005 | Nieman et al. | |
| 2003/0050127 | A1* | 3/2003 | Barrett | F16C 3/02 464/180 |

* cited by examiner

*Primary Examiner* — John Chapman, Jr.
(74) *Attorney, Agent, or Firm* — Harness, Dickey & Pierce, P.L.C.

(57) ABSTRACT

Methods for correcting a rotational imbalance of a shaft are disclosed. The methods include determining a rotational imbalance of an unbalanced shaft, determining an imbalance correction and mapping the imbalance correction to predetermined points on the shaft. The imbalance correction can be implemented through the addition of mass to or the subtraction of mass from the shaft.

18 Claims, 4 Drawing Sheets

METHOD FOR BALANCING A PROPSHAFT ASSEMBLY

FIELD

The present disclosure relates to a method for balancing a propshaft assembly.

BACKGROUND

This section provides background information related to the present disclosure which is not necessarily prior art.

Various techniques are known for balancing propshaft assemblies, including the welding or adhesive bonding of weights to the propshaft assembly at one or more locations that are identified when the propshaft is rotated about its longitudinal axis. While such processes are suited for their intended purpose, there remains a need in the art for an improved propshaft balancing technique.

For example, a significant delay time is needed when balance weights are welded to a metallic tube of a propshaft to permit the weld to cool and solidify. A longer delay is typically required for adhesive curing when adhesive materials are employed to bond a balance weight to a metallic tube of a propshaft assembly. Such delays can be disadvantageous in high volume production as they tend to limit throughput through the equipment that is used to check the rotational balance of a propshaft assembly. Moreover, as the equipment that is used to check the rotational balance of a propshaft assembly can be very expensive, it would be desirable to improve capacity (when increased capacity is desired) without the need for purchasing additional balance checking equipment. Accordingly, an improved method for balancing a propshaft assembly is needed in the art.

SUMMARY

This section provides a general summary of the disclosure, and is not a comprehensive disclosure of its full scope or all of its features.

In one form, the present disclosure provides a method that includes: providing a thin-walled tube; forming first and second sets of balancing holes radially through the thin-walled tube, wherein the balancing holes of the first set of balancing holes are spaced circumferentially apart from one another in a first predetermined manner and wherein the balancing holes of the second set of balancing hole are spaced circumferentially apart from one another in a second predetermined manner; coupling universal joints to opposite ends of the thin-walled tube after the first and second sets of balancing holes have been formed radially through the thin-walled tube; circumferentially relating at least one rotational imbalance to one of the balancing holes of the first and second sets of balancing holes; determining an imbalance correction to correct for the at least one rotational imbalance, the imbalance correction comprising a set of correction weights and a mapping of the correction weights to the balancing holes of the first and second sets of balancing holes, the mapping of the correction weights matching a specific one of the balance weights to a specific one of the balance holes of the first and second sets of balance holes, wherein each specific one of the correction weights has a mass that is tailored to the specific one of the balance holes; and installing the specific ones of the correction weights according to the mapping to form a balanced shaft assembly.

In another form, the present disclosure provides a method that includes: providing a first quantity (n) of thin-walled tubes; forming a second quantity (n+1) of sets of balancing holes in the first quantity (n) of thin-walled tubes, wherein the second quantity (n+1) is one (1) more than the first quantity (n), each set of balancing holes comprising balancing holes that are spaced circumferentially apart from one another in a predetermined manner; coupling universal joints to opposite ends of each of the thin-walled tubes after the sets of balancing holes have been formed radially through the thin-walled tubes to form a shaft assembly, the universal joints coupling each of the thin-walled tubes to one another; circumferentially relating at least one rotational imbalance of the shaft assembly to at least one set of the balancing holes; determining an imbalance correction to correct for the at least one rotational imbalance, the imbalance correction comprising a set of correction weights and a mapping of the correction weights to the balancing holes of the at least one set of balancing holes, the mapping of the correction weights matching a specific one of the balance weights to a specific one of the balance holes of the second quantity (n+1) of sets of balancing holes, wherein each specific one of the correction weights has a mass that is tailored to the specific one of the balance holes; and installing the specific ones of the correction weights according to the mapping to form a balanced shaft assembly.

In still another form, the present disclosure provides a method that includes: providing a thin-walled tube; coupling first and second universal joints to opposite ends of the thin-walled tube, the first universal joint having a first yoke portion that is welded to a first end of the thin-walled tube, the second universal joint having a second yoke portion that is welded to a second end of the thin-walled tube, each of the first and second yoke portions having a plurality of discrete added mass sections; circumferentially relating at least one rotational imbalance to the added mass sections of the first and second yoke portions; determining an imbalance correction to correct for the at least one rotational imbalance, the imbalance correction comprising a set of mass reductions and a mapping of the mass reductions to the added mass sections, the mapping of the mass reductions matching a specific one of the mass reductions to a specific one of the added mass sections such that a mass of each specific one of the mass reductions is tailored to the specific one of the added mass sections; and machining the specific ones of the added mass sections to remove material corresponding to the mapping of the mass reductions to the added mass sections to thereby form a balanced shaft assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figures 1, 2:
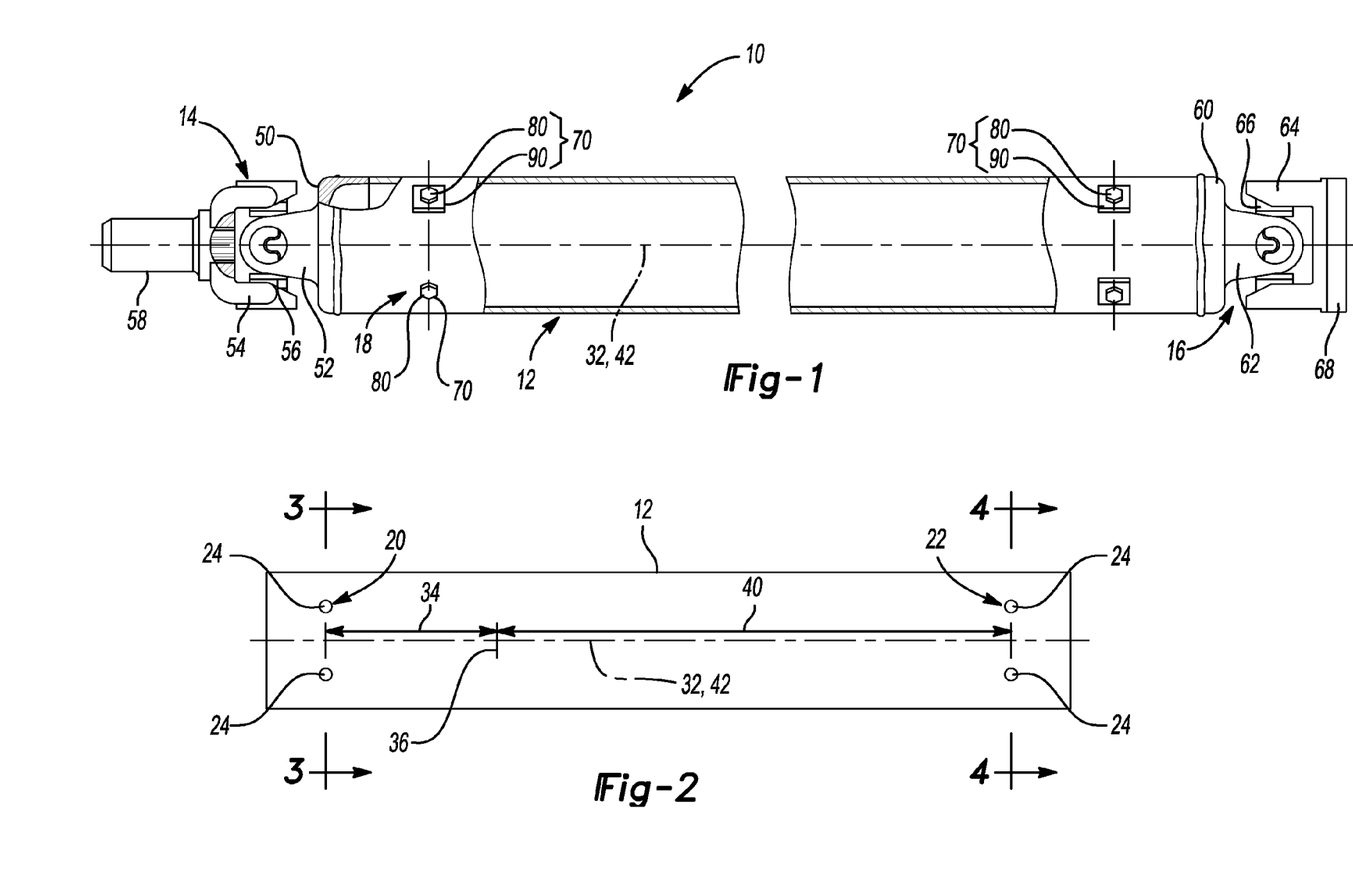
FIG. 1 is a partly sectioned side elevation view of a first propshaft assembly constructed in accordance with the teachings of the present disclosure.
FIG. 2 is a side elevation view of a portion of the first propshaft assembly of FIG. 1, illustrating a thin-walled tube in more detail.

With reference to FIG. 1 of the drawings, a propshaft assembly constructed in accordance with the teachings of the present disclosure is generally indicated by reference numeral 10. The propshaft assembly 10 comprises a tube 12, a first universal joint 14, a second universal joint 16, and a set of correction weights 18. The first and second universal joints 14 and 16 can be any type of universal joint, such as a Cardan joint.

Figure 3:
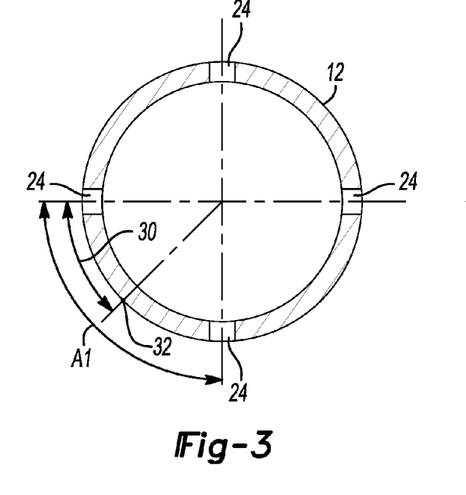
FIG. 3 is a section view taken along the line 3-3 of FIG. 2.

With reference to FIGS. 2 and 3, the tube 12 can be a relatively thin-walled tube that can be formed of a suitable material, such as aluminum or steel. First and second sets of balancing holes 20 and 22, respectively, can be formed in the tube 12. The first set of balancing holes 20 can comprise a predetermined first quantity of balancing holes 24, such as three or four holes, that can be spaced circumferentially about the tube 12 at a first predetermined circumferential spacing (e.g., a first spacing angle A1) and located at a first radial offset 30 from a predetermined radial datum 32 and a first longitudinal offset 34 from a predetermined longitudinal datum 36. For example, the first spacing angle A1 can be 120 degrees in a situation where the first quantity of balancing holes 24 is three in number, and can be 90 degrees in a situation where the first quantity of balancing holes 24 is four in number. Those of skill in the art will appreciate, however, that the balancing holes 24 of the first set of balancing holes 20 can be spaced apart from one another in any desired manner and that a spacing angle that is common to all of the balancing holes 24 of the first set of balancing holes 20 need not be employed.

Figure 4:
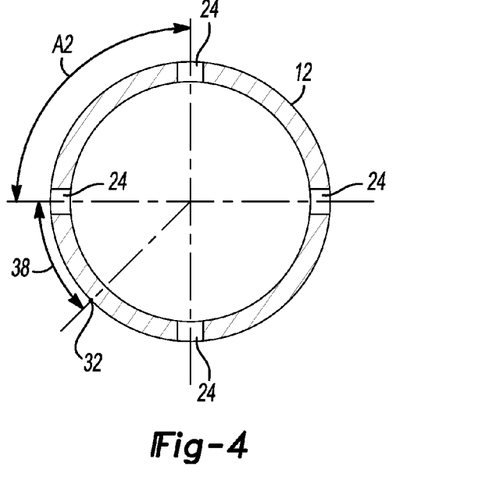
FIG. 4 is a section view taken along the line 4-4 of FIG. 2.

With reference to FIGS. 2 and 4, the second set of balancing holes 22 can comprise a predetermined second quantity of balancing holes 24, such as three or four balancing holes 24, that can be spaced circumferentially about the tube 12 at a second predetermined circumferential spacing (e.g., a second spacing angle A2) and located at a second radial offset 38 from the predetermined radial datum 32 and a second longitudinal offset 40 from the predetermined longitudinal datum 36. For example, the second spacing angle A2 can be 120 degrees in a situation where the second quantity of balancing holes 24 is three in number, and can be 90 degrees in a situation where the second quantity of balancing holes 24 is four in number. Those of skill in the art will appreciate, however, that the balancing holes 24 of the second set of balancing holes 22 can be spaced apart from one another in any desired manner and that a spacing angle that is common to all of the balancing holes 24 of the second set of balancing holes 22 need not be employed. Those of skill in the art will further appreciate that the second quantity of balancing holes 24 can be equal to or different from the first quantity of balancing holes 24. The second predetermined circumferential spacing can be equal to or different from the first predetermined circumferential spacing (e.g., the first spacing angle can be equal to or different from the second spacing angle). The first and second radial offsets 30 and 38 can be equal so that the balancing holes 24 of the first and second sets of balancing holes 20 and 22 can be disposed in lines that are parallel to a longitudinal axis 42 of the tube 12. In situations where the quantity of balancing holes 24 of the second set of balancing holes 22 is equal to the quantity of balancing holes 24 of the first set of balancing holes 20, the first and second spacing angles can be equal. The first and second longitudinal offsets 34 and 40 can be different so as to place balancing holes 24 of the first and second sets of balancing holes 20 and 22 at opposite ends of the tube 12. The balancing holes 24 of the first and second sets of balancing holes 20 and 22 can be deburred on one or both circumferential sides of the tube 12.

Returning to FIG. 1, the first universal joint 14 can comprise a first end cap 50, a first yoke 52, a second yoke 54, a first bearing system 56 and a slip coupling 58. The first end cap 50 can be fixedly coupled to a first end of the tube 12 and configured to close or substantially close the first end of the tube 12. In the particular example provided, the first end cap 50 is welded to the first end of the tube 12. The first yoke 52 can comprise a pair of yoke arms that can be fixedly coupled (e.g., integrally formed) with the first end cap 50. The second yoke 54 can comprise a pair of yoke arms that can be fixedly coupled (e.g., integrally formed) with the slip coupling 58. The slip coupling 58 can be configured to slidably but non-rotatably engage a power transmitting shaft, such as an output shaft (not shown) of a transmission (not shown). The first bearing system 56 can comprise a cross-trunnion (not specifically shown), a plurality of bearing assemblies (not specifically shown) and a plurality of bearing retainers (not specifically shown). The cross-trunnion is conventional in its configuration and defines four trunnions (not specifically shown) that are circumferentially spaced apart from one another at ninety degree intervals. Each of the bearing assemblies can comprise a bearing cup (not specifically shown), which is configured to be received in a cup aperture (not specifically shown) in an associated one of the yoke arms, and a plurality of bearing elements (not specifically shown) that can be disposed between an inside surface of the bearing cup and a surface of a corresponding one of the trunnions. Prior to coupling the first universal joint 14 to the tube 12, the first universal joint 14 can be oriented in a desired manner relative to the predetermined radial datum 32 or to one of the balancing holes 24 of the first and second sets of balancing holes 20 and 22.

The second universal joint 16 can comprise a second end cap 60, a third yoke 62, a fourth yoke 64, a second bearing system 66 and a yoke flange 68. The second end cap 60 can be fixedly coupled to a second end of the tube 12 and configured to close or substantially close the second end of the tube 12. In the particular example provided, the second end cap 60 is welded to the second end of the tube 12. The third yoke 62 can comprise a pair of yoke arms that can be fixedly coupled (e.g., integrally formed) with the second end cap 60. The fourth yoke 64 can comprise a pair of yoke arms that can be fixedly coupled (e.g., integrally formed) with the yoke flange 68. The yoke flange 68 can be configured to be fixedly but removably coupled to a power transmitting shaft, such as an input pinion (not shown) of an axle assembly (not shown). The second bearing system 66 can comprise a cross-trunnion (not specifically shown), a plurality of bearing assemblies (not specifically shown) and a plurality of bearing retainers (not specifically shown). The cross-trunnion is conventional in its configuration and defines four trunnions (not specifically shown) that are circumferentially spaced apart from one another at ninety degree intervals. Each of the bearing assemblies can comprise a bearing cup (not specifically shown), which is configured to be received in a cup aperture (not specifically shown) in an associated one of the yoke arms, and a plurality of bearing elements (not specifically shown) that can be disposed between an inside surface of the bearing cup and a surface of a corresponding one of the trunnions. Prior to coupling the second universal joint 16 to the tube 12, the second universal joint 16 can be oriented in a desired manner relative to the predetermined radial datum 32 or to one of the balancing holes 24 of the first and second sets of balancing holes 20 and 22.

With reference to FIGS. 1 and 2, the set of correction weights 18 can comprise a plurality of correction weights 70 that are coupled to the tube 12 at locations corresponding to the locations of the balancing holes 24 of the first and second sets of balancing holes 20 and 22. The mass of each of the correction weights 70 is selected based upon the location of the balancing hole 24 of the first and second sets of balancing holes 20 and 22 and the magnitude and location of the rotational imbalance of the propshaft assembly 10. More specifically, each of the correction weights 70 is configured to be matched to a specific one of the balancing holes 24 so that the set of correction weights 18 cooperate to form an imbalance correction that at least substantially cancels out a rotational imbalance of the propshaft assembly 10 prior to the installation of the set of correction weights 18 (hereafter referred to as "the unbalanced propshaft assembly").

In this regard, at least one rotational imbalance of the unbalanced propshaft assembly is determined and is circumferentially related to at least one of the balancing holes 24 of the first and second sets of balancing holes 20 and 22. An imbalance correction is determined to correct for the at least one rotational imbalance. The imbalance correction comprises the set of correction weights 18 and a mapping of the correction weights 70 to the balancing holes 24 of the first and second sets of balancing holes 20 and 22. The mapping of the correction weights 70 to the balancing holes 24 of the first and second sets of balancing holes 20 and 22 matches a specific one of the correction weights 70 to a specific one of the balancing holes 24 of the first and second sets of balancing holes 20 and 22 so that each of the correction weights 70 has a mass that is tailored to the location on the unbalanced propshaft assembly that corresponds to the specific one of the balancing holes 24. It will be appreciated that the mapping is configured to provide a location of each of the correction weights 70 in a predetermined manner relative to the predetermined radial datum 32 and the predetermined longitudinal datum 36.

Figure 5:
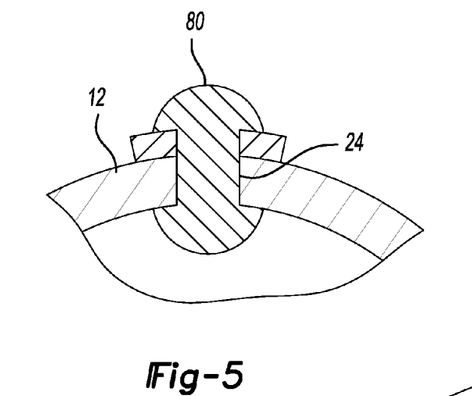
FIG. 5 is a partial lateral section view of the first propshaft assembly taken through the tube illustrating a first manner for coupling a correction weight to the tube.
Figure 6:
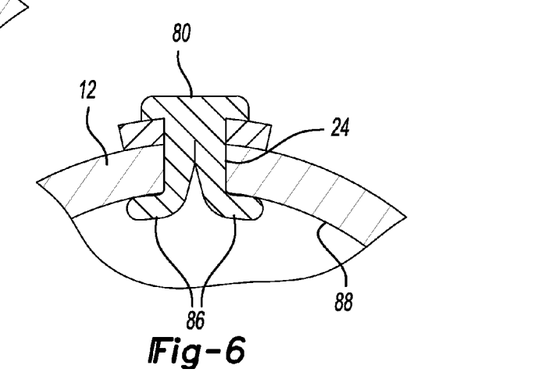
FIG. 6 is a view similar to that of FIG. 5 but illustrating a second manner for coupling a correction weight to the tube.

Minimally, each correction weight 70 can comprise a fastener 80 that is configured to be received into the balancing hole 24 and sealingly engaged to the tube 12. The fasteners 80 can be any type of fastener, and can be secured to the tube 12 via permanent deformation of the fastener 80 as shown in FIG. 5, which depicts the fastener 80 as a rivet, or through resilient (elastic) deformation of the fastener 80 as shown in FIG. 6, which depicts the fastener 80 as having at least one resilient element 86 that is configured to be pushed through the thin-walled tube 12 such that the resilient element(s) 86 of each fastener is/are engaged to an interior surface 88 of the thin-walled tube 12 to thereby secure the fasteners 80 to the thin-walled tube 12. Returning to FIGS. 1 and 2, the fastener 80 can alternatively be a threaded fastener that is configured to threadably engage the tube 12 and configured to substantially seal a corresponding one of the balancing holes 24. In the particular example provided, the threaded fasteners comprise self-tapping fasteners that are removably coupled to the tube 12.

Each correction weight 70 may additionally comprise a mass member 90 that can be secured to the tube 12 via the fastener 80. The mass member 90 can have a mass that is sized or selected based upon the location of its associated balancing hole 24 and the magnitude and location of the rotational imbalance of the propshaft assembly 10. In situations where the mass member 90 is selected, those of skill in the art will appreciate that the mass member 90 could be selected from a group of mass members 90 having different but predetermined masses (e.g., the group of mass members 90 can comprise a mass member 90 having a mass of 5 grams, a mass member 90 having a mass of 10 grams, a mass member 90 having a mass of 15 grams and a mass member 90 having a mass of 20 grams).

Generally speaking, the masses of the correction weights 70 (i.e., the fasteners 80 and the mass members 90) is configured to create an imbalance correction that will at least substantially cancel out the rotational imbalance of the unbalanced propshaft assembly. The use of threaded fasteners as the fasteners 80 that secure the mass members 90 to the tube 12 is advantageous in that it permits disassembly of one or more of the correction weights 70 in the event that it is necessary to modify the correction imbalance. Moreover, the use of threaded fasteners permits the propshaft assembly 10 to be rotationally balanced after the tube 12 and the first and second universal joints 14 and 16 have been painted.

Accordingly, a method for balancing the unbalanced propshaft assembly can comprise: providing a thin-walled tube 12; forming first and second sets of balancing holes 20 and 22 radially through the thin-walled tube 12, wherein the balancing holes 24 of the first set of balancing holes 20 are spaced circumferentially apart from one another in a first predetermined manner and wherein the balancing holes 24 of the second set of balancing holes 22 are spaced circumferentially apart from one another in a second predetermined manner; coupling first and second universal joints 14 and 16 to opposite ends of the thin-walled tube 12 after the first and second sets of balancing holes 20 and 22 have been formed radially through the thin-walled tube 12; circumferentially relating at least one rotational imbalance to one of the balancing holes 24 of the first and second sets of balancing holes 20 and 22; determining an imbalance correction to correct for the at least one rotational imbalance, the imbalance correction comprising a set of correction weights 18 and a mapping of the set of correction weights 18 to the balancing holes 24 of the first and second sets of balancing holes 20 and 22, the mapping of the set of correction weights 18 matching a specific one of the correction weights 70 to a specific one of the balancing holes 24 of the first and second sets of balancing holes 20 and 22, wherein each specific one of the correction weights 70 has a mass that is tailored to the specific one of the balancing holes 24; and installing the specific ones of the correction weights 70 according to the mapping to form a balanced shaft assembly 10.

Figure 7:
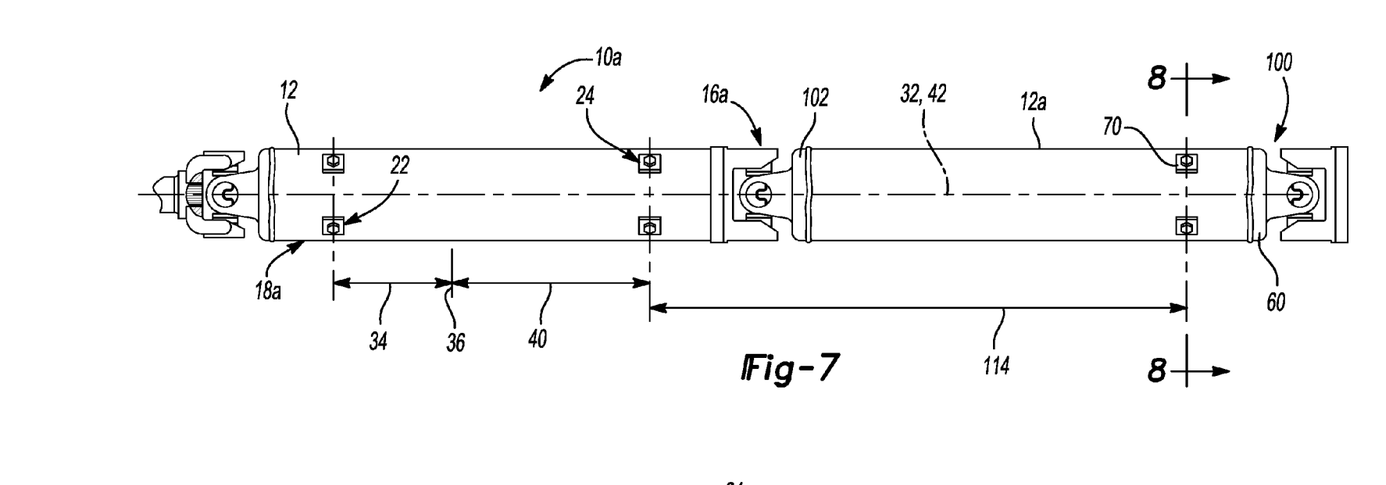
FIG. 7 is a partly sectioned side elevation view of a second propshaft assembly constructed in accordance with the teachings of the present disclosure.

It will be appreciated that the method of the present disclosure has application to propshaft assemblies having more than one tube, such as the propshaft assembly 10a of FIG. 7. In this example, the propshaft assembly 10a additionally includes a second tube 12a and a third universal joint 100, and both the second universal joint 16a and the set of correction weights 18a are modified somewhat from the configuration that was discussed above.

The second universal joint 16a can be configured with a third end cap 102 instead of the yoke flange. The third end cap 102 can be fixedly coupled to the second tube 12a so that the second universal joint 16a directly couples the tube 12 to the second tube 12a. The set of correction weights 18a can be generally similar to the set of correction weights 18 (FIG. 1) discussed above, except that it can include additional correction weights 70 that are configured for use with the second tube 12a.

Figure 8:
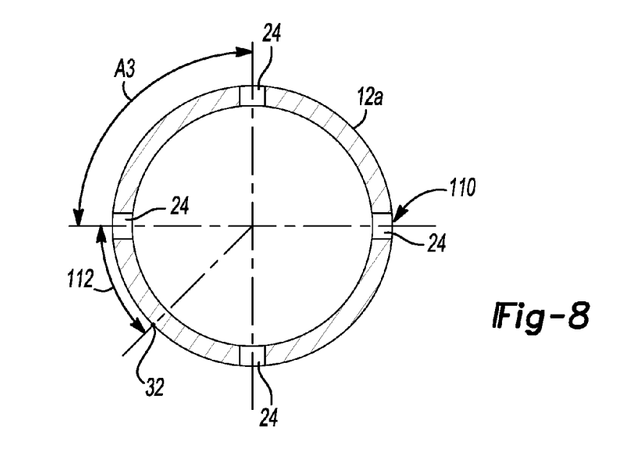
FIG. 8 is a section view taken along the line 8-8 of a portion of the second propshaft assembly of FIG. 7, the view illustrating the construction of a second tube.

With reference to FIGS. 7 and 8, the second tube 12a can be a relatively thin-walled tube that can be formed of a suitable material, such as aluminum or steel. A third set of balancing holes 110 can be formed in the tube 12a. The third set of balancing holes 110 can comprise a predetermined third quantity of balancing holes 24, such as three or four holes, that can be spaced circumferentially about the tube 12 at a third predetermined circumferential spacing (e.g., a third spacing angle) and located at a third radial offset 112 from the predetermined radial datum 32 and a third longitudinal offset 114 from the predetermined longitudinal datum 36. The third quantity of balancing holes 24 can be equal to or different from the first quantity of balancing holes 24 and/or the second quantity of balancing holes 24. The third predetermined circumferential spacing can be equal to or different from the first predetermined circumferential spacing (e.g., the first spacing angle A1 (FIG. 3) can be equal to or different from the third spacing angle A3) and/or the third predetermined circumferential spacing can be equal to or different from the second predetermined circumferential spacing (e.g., the second spacing angle A2 (FIG. 4) can be equal to or different from the third spacing angle A3). The third radial offset 112 can be equal to the first radial offset 30 (FIG. 3) and the second radial offset 38 (FIG. 4) so that the balancing holes 24 of the first, second and third sets of balancing holes 20, 22 and 110 can be disposed in lines that are parallel to a longitudinal axis 42 of the tube 12 in situations where the quantity of balancing holes 24 of the first, second and third sets of balancing holes 20, 22 and 110 are equal and the first, second and third spacing angles A1 (FIG. 3), A2 (FIG. 4) and A3 are equal. The third longitudinal offset 114 can be configured to place the balancing holes 24 of the third set of balancing holes 110 at an end of the second tube 12a that is proximate the third universal joint 100. The balancing holes 24 of the third set of balancing holes 110 can be deburred on one or both circumferential sides of the second tube 12a.

The third universal joint 100 can be any type of universal joint, such as a Cardan joint. In the particular example provided, the third universal joint 100 is configured in a manner that is similar to that of the second universal joint 16 (FIG. 1). Accordingly, other than merely noting that its (second) end cap 60 is fixedly coupled to the tube 12a on an end opposite the end to which the second universal joint 16a is coupled, a detailed discussion of the configuration of the third universal joint 100 need not be provided herein.

Accordingly, a method for balancing the unbalanced, multi-tube propshaft assembly can comprise: providing a first quantity (n) of thin-walled tubes; forming a second quantity (n+1) of sets of balancing holes in the first quantity (n) of thin-walled tubes, wherein the second quantity (n+1) is one (1) more than the first quantity (n), each set of balancing holes comprising balancing holes that are spaced circumferentially apart from one another in a predetermined manner; coupling universal joints to opposite ends of each of the thin-walled tubes after the sets of balancing holes have been formed radially through the thin-walled tubes to form a shaft assembly, the universal joints coupling each of the thin-walled tubes to one another; circumferentially relating at least one rotational imbalance of the shaft assembly to at least one set of the balancing holes; determining an imbalance correction to correct for the at least one rotational imbalance, the imbalance correction comprising a set of correction weights and a mapping of the correction weights to the balancing holes of the at least one set of balancing holes, the mapping of the correction weights matching a specific one of the balance weights to a specific one of the balance holes of the second quantity (n+1) of sets of balancing holes, wherein each specific one of the correction weights has a mass that is tailored to the specific one of the balance holes; and installing the specific ones of the correction weights according to the mapping to form a balanced shaft assembly.

Figure 9:
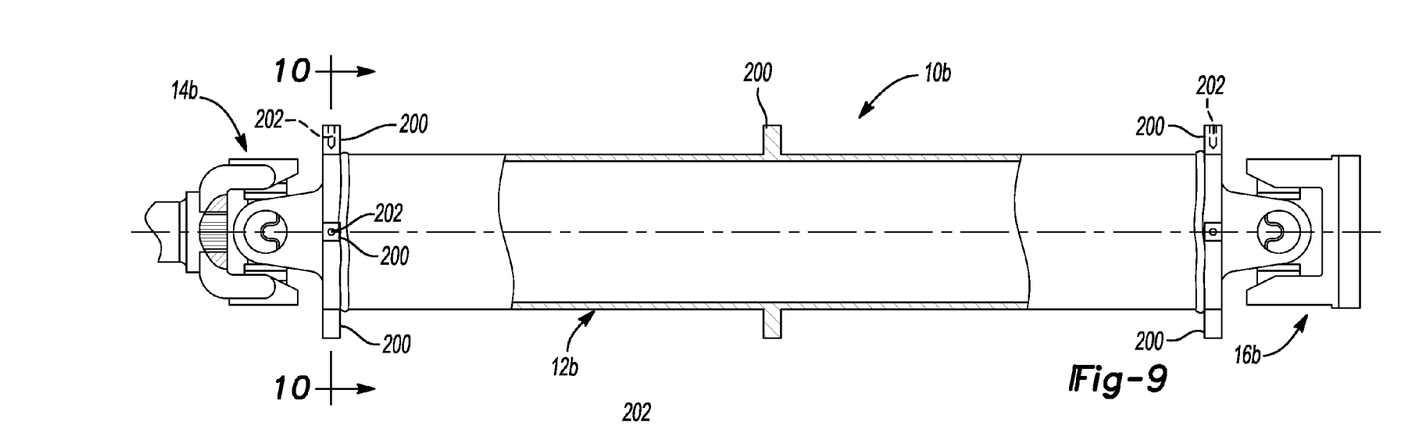
FIG. 9 is a partly sectioned side elevation view of a third propshaft assembly constructed in accordance with the teachings of the present disclosure.
Figure 10:
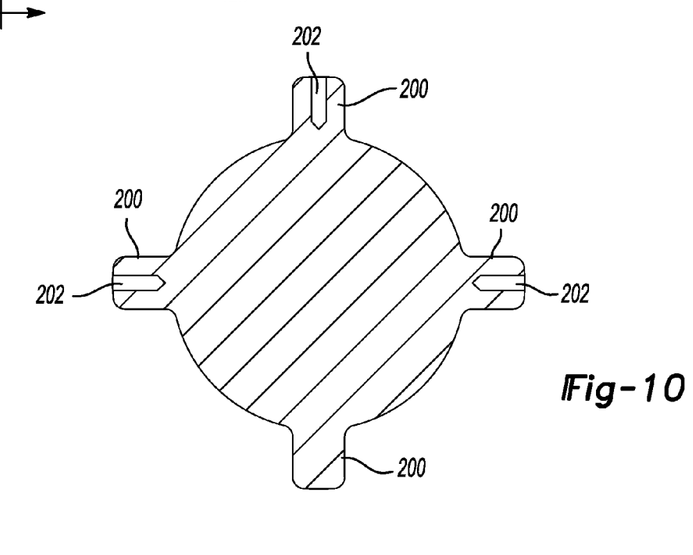
FIG. 10 is a section view taken along the line 10-10 of FIG. 9.

While the above-referenced discussion has focused on the addition of (correction) weights to the tube(s) of a propshaft assembly to create an imbalance correction that reduces or eliminates at least one rotational imbalance, it will be appreciated that the invention, in its broadest aspects, could be configured somewhat differently. With reference to FIGS. 9 and 10 for example, the unbalanced propshaft assembly could be configured with a plurality of added mass sections 200 (i.e., sections or portions of a tube or universal joint having mass that is included for use in rotationally balancing the propshaft assembly 10b). In the particular example provided, the added mass sections 200 are formed on the first and second universal joints 14b and 16b and the tube 12b and the imbalance correction is defined by a plurality of mass reductions 202 that are mapped to the added mass sections 200. Each of the mass reductions 202 involves a removal of mass from a corresponding one of the added mass sections 200 to create the imbalance correction. Removal of mass may be achieved via machining, such as drilling or milling.

Accordingly, a method for balancing the unbalanced, propshaft assembly can comprise: providing a thin-walled tube 12; coupling first and second universal joints 14b and 16b to opposite ends of the thin-walled tube 12, the first universal joint 14b having a first yoke portion that is welded to a first end of the thin-walled tube 12b, the second universal joint 16b having a second yoke portion that is welded to a second end of the thin-walled tube 12b, each of the first and second yoke portions having a plurality of discrete, circumferentially spaced apart added mass sections 200; circumferentially relating at least one rotational imbalance to the added mass sections 200 of the first and second yoke portions; determining an imbalance correction to correct for the at least one rotational imbalance, the imbalance correction comprising a set of mass reductions 202 and a mapping of the mass reductions 202 to the added mass sections 200, the mapping of the mass reductions 202 matching a specific one of the mass reductions 202 to a specific one of the added mass sections 200 such that a mass of each specific one of the mass reductions 202 is tailored to the specific one of the added mass sections 200; and machining the specific ones of the added mass sections 200 to remove material corresponding to the mapping of the mass reductions 202 to the added mass sections 202 to thereby form a balanced shaft assembly 10b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
   providing a thin-walled tube;
   forming first and second sets of balancing holes radially through the thin-walled tube, wherein the balancing holes of the first set of balancing holes are spaced circumferentially apart from one another in a first predetermined manner and wherein the balancing holes of the second set of balancing hole are spaced circumferentially apart from one another in a second predetermined manner;
   forming a rotationally imbalanced shaft assembly by coupling universal joints to opposite ends of the thin-walled tube after the first and second sets of balancing holes have been formed radially through the thin-walled tube;
   associating a rotational imbalance of the rotationally imbalanced shaft assembly with at least two specific ones of the balancing holes;
   determining an imbalance correction to correct for the rotational imbalance in the rotationally imbalanced shaft assembly, the imbalance correction comprising a set of correction weights having different weight values and a mapping of the correction weights to the specific ones of the balancing holes, the mapping of the correction weights matching specific ones of the correction weights to the specific ones of the balance holes, wherein each specific one of the correction weights has a mass that is tailored to the specific one of the balance holes it is mapped to; and
   installing the specific ones of the correction weights to the rotationally imbalanced shaft assembly according to the mapping to form a balanced shaft assembly.

2. The method of claim 1, wherein each correction weight comprises a fastener that is received into one of the balancing holes of the first and second sets of balancing holes.

3. The method of claim 2, wherein the fastener is a threaded fastener.

4. The method of claim 2, wherein the fastener is permanently deformed to secure the fastener to the thin-walled tube.

5. The method of claim 4, wherein the fastener is a rivet.

6. The method of claim 2, wherein the fasteners comprising at least one resilient element and are configured to be pushed through the thin-walled tube such that the at least one resilient element of each of the fasteners engages an interior surface of the thin-walled tube to thereby secure the fasteners to the thin-walled tube.

7. The method of claim 2, wherein the fastener is removable from the thin-walled tube.

8. The method of claim 2, wherein a portion of the correction weights further comprise a balance weight that is mounted to the thin-walled tube by an associated one of the fasteners.

9. The method of claim 8, comprising selecting each balance weight from a plurality of predetermined masses.

10. The method of claim 1, wherein at least one of the universal joints comprises a Cardan joint.

11. The method of claim 1, wherein prior to coupling the universal joints to the opposite ends of the thin-walled tube, the method comprises orienting a portion of one of the universal joints to the thin-walled tube such that a predetermined point on the portion of the one of the universal joints is radially aligned to one of balancing holes of the first and second sets of balancing holes.

12. The method of claim 1, wherein the first predetermined manner for circumferentially spacing the balancing holes of the set of first balancing holes employs a first spacing angle between each adjacent pair of the balancing holes of the set of first balancing holes.

13. The method of claim 12, wherein the second predetermined manner for circumferentially spacing the balancing holes of the set of second balancing holes employs a second spacing angle between each adjacent pair of the balancing holes of the set of second balancing holes.

14. The method of claim 13, wherein the first and second spacing angles are equal.

15. The method of claim 1, wherein each of the balancing holes of the set of second balancing holes is disposed in a line parallel to a longitudinal axis of the thin-walled tube with one of the balancing holes of the set of first balancing holes.

16. The method of claim 1, wherein a quantity of the balancing holes of the set of first balancing holes is equal to a quantity of the balancing holes of the set of second balancing holes.

17. A method comprising:
    providing a first quantity (n) of thin-walled tubes;
    forming a second quantity (n+1) of sets of balancing holes in the first quantity (n) of thin-walled tubes, wherein the second quantity (n+1) is one (1) more than the first quantity (n), each set of balancing holes comprising balancing holes that are spaced circumferentially apart from one another in a predetermined manner;
    coupling universal joints to opposite ends of each of the thin-walled tubes after the sets of balancing holes have been formed radially through the thin-walled tubes to form a shaft assembly, the universal joints coupling each of the thin-walled tubes to one another;
    associating a rotational imbalance of the shaft assembly with at least two specific ones of the balancing holes;
    determining an imbalance correction to correct for the rotational imbalance, the imbalance correction comprising a set of correction weights having different weight values and a mapping of the correction weights to the at least two specific ones of the balancing holes, the mapping of the correction weights matching specific ones of the balance weights to specific ones of the balance holes of the second quantity (n+1) of sets of balancing holes, wherein each specific one of the correction weights has a mass that is tailored to an associated one of the at least two specific ones of the balancing holes; and
    installing the specific ones of the correction weights according to the mapping to form a balanced shaft assembly.

18. A method comprising:
    providing a thin-walled tube;
    coupling first and second universal joints to opposite ends of the thin-walled tube, the first universal joint having a first yoke portion that is welded to a first end of the thin-walled tube, the second universal joint having a second yoke portion that is welded to a second end of the thin-walled tube, each of the first and second yoke portions having a plurality of circumferentially spaced apart discrete added mass sections;

associating a rotational imbalance to with at least a specific pair of the added mass sections of the first and second yoke portions;

determining an imbalance correction to correct for the rotational imbalance, the imbalance correction comprising a set of determined, and a mapping of the determined mass reductions to the added mass sections, the mapping of the determined mass reductions matching each specific one of the determined mass reductions to a different specific one of the added mass sections such that a mass of each specific one of the determined mass reductions is tailored to specific ones of the added mass sections; and machining the specific ones of the added mass sections to remove material corresponding to the mapping of the determined mass reductions to the added mass sections to thereby form a balanced shaft assembly.

\* \* \* \* \*